(12) United States Patent
Weh et al.

(10) Patent No.: US 12,420,757 B2
(45) Date of Patent: Sep. 23, 2025

(54) HYDRAULIC UNIT FOR AN ELECTRONICALLY SLIP-CONTROLLABLE VEHICLE BRAKE SYSTEM

(71) Applicant: Robert Bosch GmbH, Stuttgart (DE)

(72) Inventors: Andreas Weh, Sulzberg (DE); Florian Breyer, Oberstaufen (DE); Matthias Mayr, Rettenberg (DE); Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 453 days.

(21) Appl. No.: 17/894,324

(22) Filed: Aug. 24, 2022

(65) Prior Publication Data

US 2023/0072396 A1 Mar. 9, 2023

(30) Foreign Application Priority Data

Sep. 6, 2021 (DE) ...................... 10 2021 209 806.1

(51) Int. Cl.
*B60T 8/176* (2006.01)
*B60T 13/66* (2006.01)

(52) U.S. Cl.
CPC ............ *B60T 8/176* (2013.01); *B60T 13/662* (2013.01); *B60T 2270/10* (2013.01)

(58) Field of Classification Search
CPC .... B60T 8/176; B60T 13/662; B60T 2270/10; B60T 8/343
See application file for complete search history.

(56) References Cited

U.S. PATENT DOCUMENTS

| 5,743,093 A * | 4/1998 | Nakayoku ............... B60T 11/26 60/585 |
| 2006/0157141 A1* | 7/2006 | von Hayn ............... B60T 11/26 141/95 |

(Continued)

FOREIGN PATENT DOCUMENTS

FR 2908097 A1 * 5/2008 ............. B60T 11/26
WO 2019057391 A1 3/2019

OTHER PUBLICATIONS

Spanish Patent ES 2310254 to Demersseman et al published on Jan. 1, 2009.*

(Continued)

*Primary Examiner* — Pamela Rodriguez
(74) *Attorney, Agent, or Firm* — NORTON ROSE FULBRIGHT US LLP (57) ABSTRACT

A hydraulic unit for an electronically slip-controllable power brake system of a motor vehicle. A cuboidal housing block is equipped with components for generating a braking pressure and for open- or closed-loop control thereof. On a motor side of the housing block, a motor is fastened to drive a braking pressure generator, while on a reservoir side, a reservoir is provided to supply the vehicle brake system with a pressure medium. The reservoir has at least one protruding fastening peg, which projects into a recess open to the outside on the housing block. Using a retaining pin inserted into a transverse bore of the housing block and passing through this recess, the reservoir is anchored to the housing block. The transverse bore, open on the motor side of the housing block, is in a flat portion in which a pin head of the retaining pin lies without the pin head protruding axially beyond a motor side of the housing block.

11 Claims, 5 Drawing Sheets

(56) References Cited

U.S. PATENT DOCUMENTS

2007/0125080 A1* 6/2007 Bourlon ................. B60T 11/22
                                                       60/585
2021/0129816 A1* 5/2021 Weh ....................... B60T 7/042

OTHER PUBLICATIONS

WO document No. WO 2014050691 to Sagayama published on Apr. 3, 2014.*

Translation of WO document No. WO 2019057391 to Molto et al obtained from website: https://worldwide.espacenet.com on Dec. 11, 2024.*

* cited by examiner

HYDRAULIC UNIT FOR AN ELECTRONICALLY SLIP-CONTROLLABLE VEHICLE BRAKE SYSTEM

CROSS REFERENCE

The present application claims the benefit under 35 U.S.C. § 119 of German Patent Application No. DE 10 2021 209 806.1 filed on Sep. 6, 2021, which is expressly incorporated herein by reference in its entirety.

FIELD

The present invention relates to a hydraulic unit for an electronically slip-controllable vehicle brake system.

BACKGROUND INFORMATION

Vehicle brake systems with electronic wheel slip control are sufficiently described in the related art. Such systems allow individual adjustment of the braking pressure in the wheel brakes of the various wheels of a vehicle as a function of the respectively prevailing slip conditions and thus the prevention of wheel slip during vehicle acceleration operations (traction control) or braking operations (anti-lock control). Furthermore, a purposeful build up of braking pressure can also effectively counteract unstable driving states (dynamic stability control) of a vehicle, so improving driving safety. An electronic control device of the vehicle brake system detects incoming signals from on-vehicle sensors and evaluates them to produce actuation signals with which components for generating braking pressure and for open- or closed-loop control thereof are electrically actuated as required. With slip-dependent closed-loop control of the braking pressure, rolling of the wheels on a carriageway and consequently maintenance of vehicle steerability is guaranteed, within physical limits. Build up of braking pressure and braking pressure closed-loop control may be carried out by these vehicle brake systems with or without driver participation.

A key component of an electronic slip-controllable vehicle brake system is a "hydraulic unit". This comprises a cuboidal housing block, on which said electrically drivable components for generating braking pressure and open- or closed-loop control thereof are arranged. The selected term "electrically drivable components" in this respect in particular covers the drive for a pressure generator and electrically actuatable valves.

Furthermore, the electronic control device is mounted to the housing block to achieve electrical actuation of these components which is adapted to requirements. According to the present invention, a brake master cylinder allowing the driver to specify a braking intention and an associated reservoir for supplying the power brake system with pressure medium are additionally incorporated into the housing block or fastened to the housing block.

Such a hydraulic unit is distinguished by its compact construction and the relatively little effort associated with installing it in a vehicle body and with bringing it into pressure medium-conveying contact with the wheel brakes.

Because the installation space available in a vehicle body is fundamentally limited, constant efforts are made to optimize the structural volume of a hydraulic unit. It is moreover advantageous for at least the assemblies mounted to the hydraulic unit, in particular the reservoir, the electronic control device or the motor, to be mutually independently accessible from outside to allow repair work or component replacement where necessary without additional work on the other, non-defective mounted parts.

A hydraulic unit for an electronically controllable vehicle brake system is described in PCT Patent Application Publication No. WO 2019/057391 A1.

This hydraulic unit has a cuboidal housing block which is equipped with components for generating braking pressure and for open- or closed-loop control thereof. A motor is mounted on a motor side of the housing block for driving a component generating a braking pressure. On the opposite side from the motor side, a control device side of the housing block is located with a likewise mounted electronic control device for electrical actuation of said components in line with requirements. On a reservoir side of the housing lock, a reservoir for pressure medium is mounted and brought into pressure medium-conveying contact with the housing block. The reservoir side adjoins the motor side and likewise the control device side.

For fastening thereof to the housing block, the reservoir has a fastening peg which protrudes from the reservoir toward the reservoir side of the housing block and is associated with a recess provided on the housing block and open toward the reservoir side. In the mounted state, the fastening peg of the reservoir projects into these recesses. Furthermore, a retaining pin is present, which is received in a transverse bore of the housing block. This transverse bore opens into the recess for the fastening peg in the housing block and ends there. In addition, the transverse bore is aligned with a through-hole at the end of the fastening peg, such that the retaining pin inserted into the transverse bore passes with its end projecting into the interior of the housing block through the fastening peg and thereby ultimately joins the reservoir to the housing block.

The retaining pin is screwed into the transverse bore and to this end has a central portion on which an external thread is formed. The counter or internal thread is located on the housing block between the outer side and the recess for the fastening peg.

In the screwed-in final state, a retaining pin head projects axially relative to the outer side of the housing block. This projecting portion of the retaining pin is of cylindrical construction and serves as a second bearing point for the reservoir. On a longitudinal side of the reservoir, a tab protruding toward the housing block is to this end provided with a bearing bore, through which the projecting portion of the retaining pin passes.

This second bearing point of the reservoir has in particular proven disadvantageous as the tab of the reservoir rests laterally against the associated outer side of the housing block and consequently covers a sub-region of this outer side. The bearing point thus prevents the housing block from being brought into contact with brake lines, of which at least one of the connections provided therefor is likewise located on the outer side in question.

In addition, the two bearing points for the reservoir require a correspondingly long and complex to produce retaining pin with two journal portions with external diameters of different sizes and a central portion arranged therebetween for the thread. A retaining pin configured in this way is not commercially available and is accordingly expensive to procure or produce.

In addition, in the related art mentioned above, a third device is also present via which the reservoir is fastened to the housing block. This comprises a tab formed in one piece with the reservoir and projecting toward the housing lock and having a receiving opening for fastening means screwable into the housing block. This tab, unlike the tab of the second bearing point of the reservoir, rests against one of the narrow or transverse sides of the housing block.

Accordingly, the conventional reservoir is fastened to the housing block from two different spatial directions and moreover using different types of fastening means. In particular, the fastening means of the third fastening point is difficult to access when the hydraulic unit is in the installed state, since a plug housing of the electronic control device is likewise on the narrow side in question of the housing block and consequently makes access to the fastening means with a screw assembly tool more difficult, in particular if a device plug is plugged into said plug housing. Removal of the reservoir, if required, is thus not straightforwardly possible without additional work on the other mounted parts of the hydraulic unit.

SUMMARY

The present invention may have an advantage over the above that it is possible to dispense with a retaining pin projecting relative to the outer side of the housing block. A retaining pin according to the present invention is markedly shorter than in the related art and lies with a pin head in a flat portion on the motor side of the housing block. This retaining pin thus does not prevent the production or release of pressure medium-conveying contact between the housing block and external lines. Unlike in the cited related art, according to an example embodiment of the present invention, the reservoir is fastened to the housing block only from the motor side and is therefore less labor-intensive. If needed, the reservoir anchored with the retaining pins can be readily detached from the housing block and replaced, without additional work on the unaffected mounted parts of the hydraulic unit being necessary therefor. More working space is available on the motor side of the hydraulic unit for using a necessary tool. To anchor the reservoir to the housing block of the hydraulic unit, at most two retaining pins are needed, which may moreover be of identical construction.

Further advantages or advantageous further developments of the present invention are disclosed herein.

According to an example embodiment of the present invention, the retaining pin(s) provided is/are relatively simply configured components, which can be inexpensively produced, preferably by forming. For example, the retaining pin head is produced during roll-threading of an external thread onto a shank portion and consequently does not have to be produced separately. Moreover, the pin head no longer acts as a bearing point for the reservoir, whereby its outer circumference is then available to form working surfaces for a screw assembly tool. The necessary quality of these working surfaces can likewise be achieved by forming. The thread on the shank of the retaining pin is a self-tapping thread, with which the retaining pin cuts into the wall of the transverse bore in the housing block. The retaining pin is axially supported at its end, which ultimately makes a supporting surface on the pin head unnecessary and further facilitates production of the retaining pin by forming.

A single retaining pin or at most two retaining pins is/are sufficient to fasten the reservoir to the housing block. The connections with which the reservoir is brought into pressure medium-conveying contact with the housing block are put in place as a function of the number of retaining pins used and the position thereof on the reservoir. In this way, moment equilibrium can be simply achieved at the reservoir, i.e. the forces acting on the reservoir and transferred by the retaining pins and the forces which are transferred to the reservoir during assembly of the pressure medium connections cause torques at the reservoir, the effects of which cancel each other out. The reservoir is thus free of tipping movements and accordingly protected against shaking or vibration at the housing block. This latter reduces the risk of premature, repair-necessitating damage to the reservoir. Apart from this, arrangement of the connections on the reservoir results in centering of the latter on the housing block during assembly.

The fastening of the reservoir to the housing block which underlies the present invention furthermore makes it possible for the reservoir to cover the reservoir side of the housing block and moreover at least one part of a peripheral side, facing the reservoir side, of the control device. In other words, the disclosed fastening method according to the present invention allows enlargement of a base surface of the reservoir and thus an optionally enlarged storage volume. It would conversely of course also be possible to use a reservoir which, for a specified storage volume, is of flatter construction and thus reduces the structural height of the hydraulic unit as a whole.

BRIEF DESCRIPTION OF THE DRAWINGS

Exemplary embodiments of the present invention are illustrated in the figures and explained in more detail in the following description.

Mutually corresponding components or component details are provided with uniform reference signs in the figures.

DETAILED DESCRIPTION OF EXAMPLE EMBODIMENTS

As explained above, FIG. 1 shows a hydraulic unit (10) according to the present invention. This hydraulic unit (10) comprises as central element a cuboidal housing block (12) which is equipped (visible schematically and only in part in FIG. 3) with electrically actuatable components for generating braking pressure and for open- or closed-loop control thereof. These components are inserted into receptacles of the housing block (12) provided therefor and connected together in pressure medium-conveying manner via channels (in each case FIG. 3) extending inside the housing block (12). The receptacles and channels are in each case produced by machining of the housing block (12).

Figure 1:
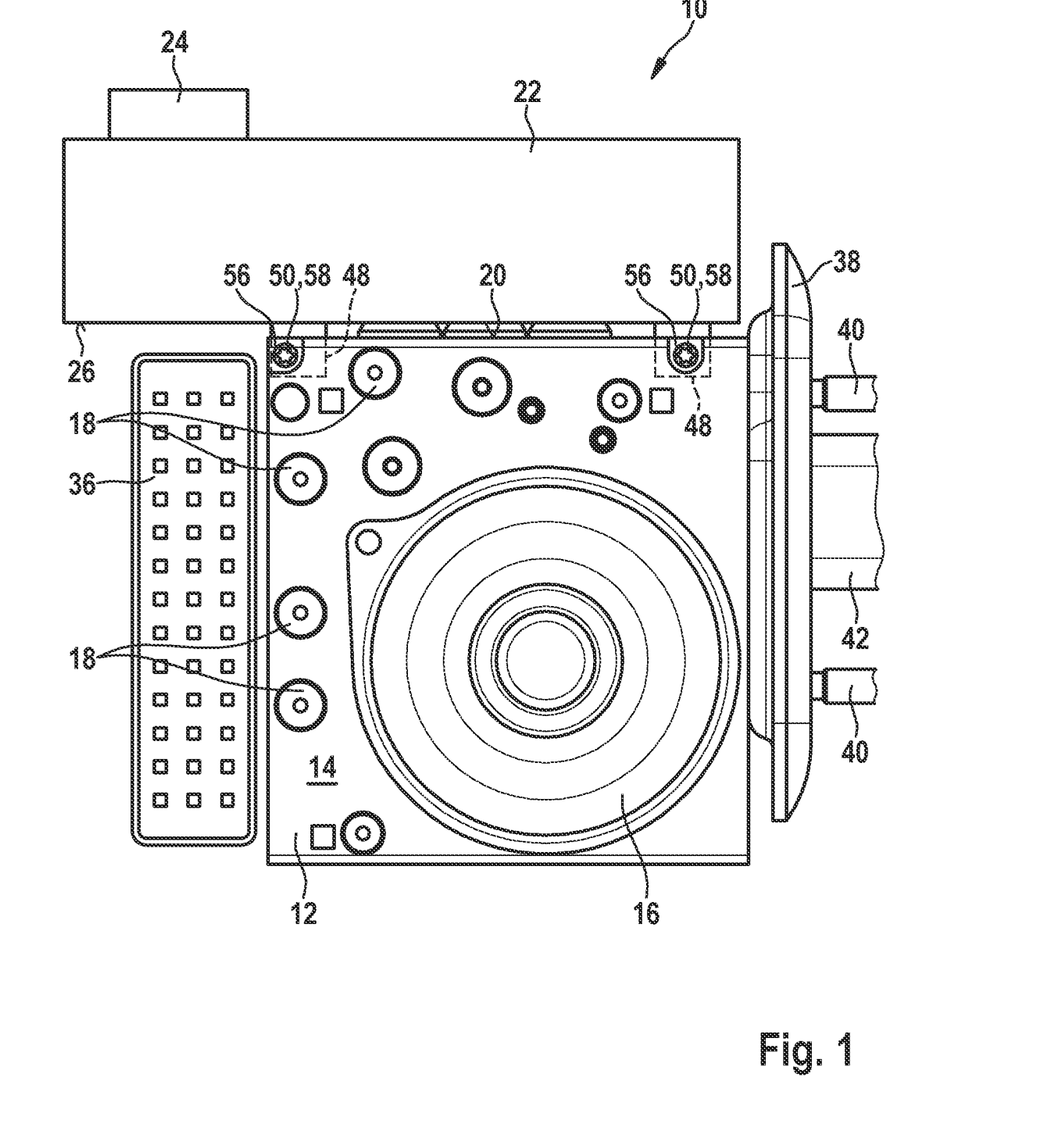
FIG. 1 shows a hydraulic unit according to the present invention in a direction of view perpendicular to the motor side of the housing block.

FIG. 1 allows a view onto a motor side (14) of the housing block (12). On this motor side (14), a motor (16) with a cylindrical motor housing is mounted, with which a component for producing a braking pressure and received inside the housing block is drivable. The motor (16) is preferably fastened via screwed joints to a housing block-side flange plate of the motor housing.

A plurality of channels open on the motor side and are tightly closed relative to the surrounding environment, for example by press-fitted balls. Other channels serve to bring the housing block (12) into pressure medium-conveying contact with brake lines, which lead to the wheel brakes of the vehicle brake system. The mouths of these channels are therefore embodied as connections (18) into which the brake lines can preferably be screwed. In FIG. 1, these connections (18) are placed in the top left hand part of the housing block (12), i.e. close to a reservoir side (20) or a reservoir (22) fastened thereto.

Figure 2:
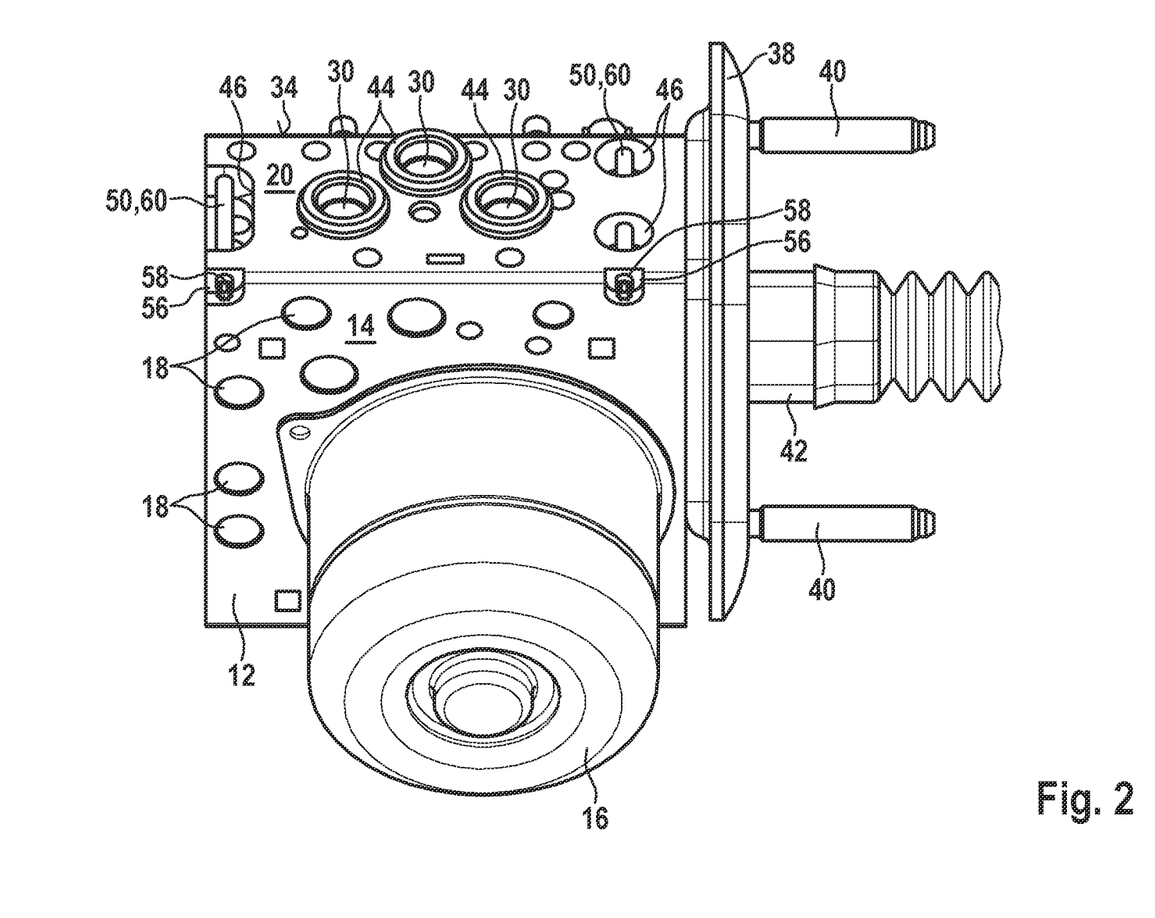
FIG. 2 is a view from top right onto a hydraulic unit according to a first exemplary embodiment of the present invention, wherein the reservoir of this hydraulic unit has been removed, so as to reveal the interface between the housing block and the reservoir.
Figure 4:
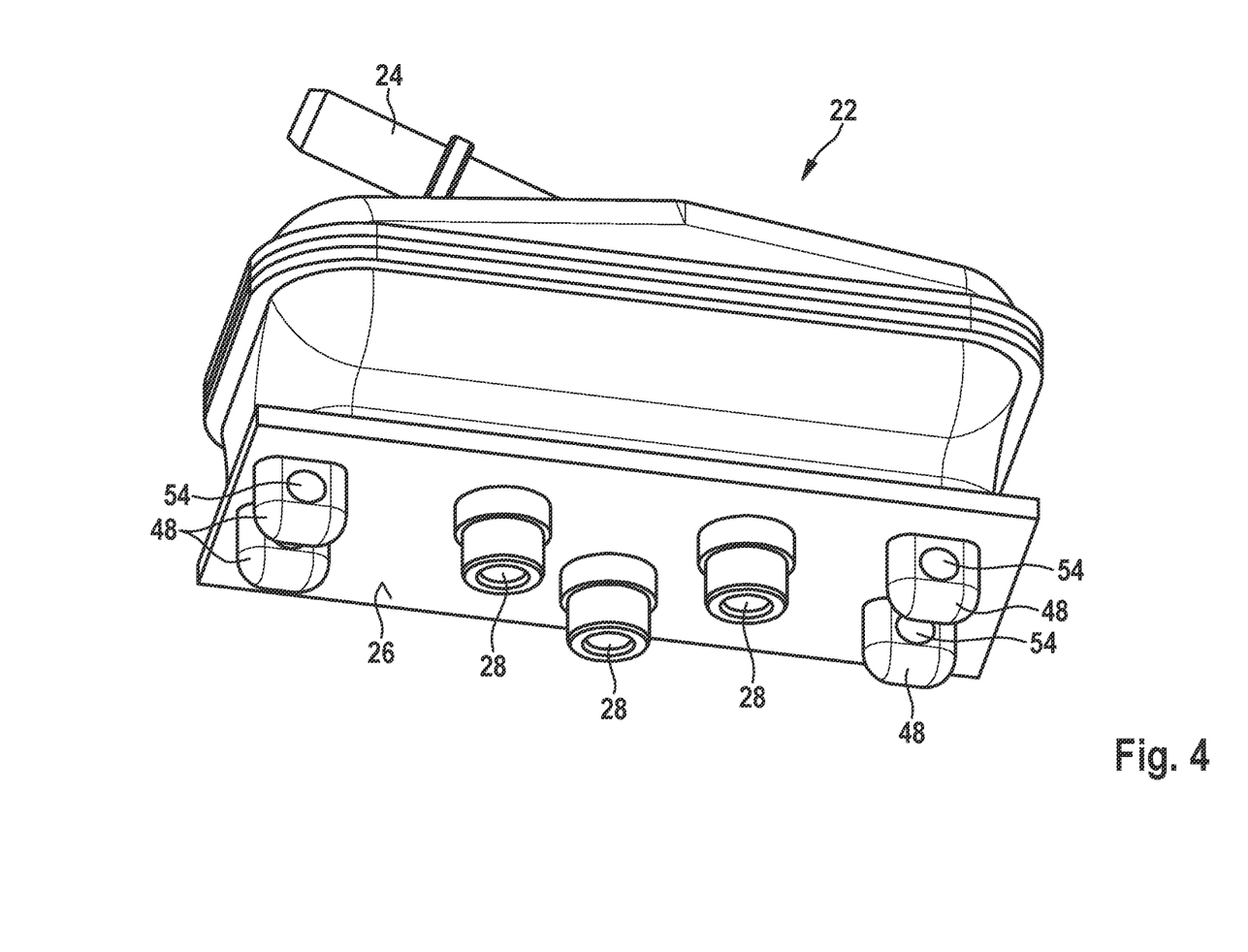
FIG. 4 shows the interface of the reservoir according to exemplary embodiment 1 with the housing block and at the same time discloses the devices for fastening thereof to the housing block or bringing it into pressure medium contact therewith.

The reservoir (22) comprises a hollow container, which can be filled with pressure medium via a closable, upwardly pointing filling port (24). To supply the vehicle brake system with the pressure medium, the reservoir (22) is brought into pressure medium-conveying contact with the housing block (12). As FIG. 4 shows, to this end connection ports (28) are provided which are arranged on a base side (26) of the reservoir (22) facing the reservoir side (20) of the housing block (12) and protrude from the reservoir (22) toward the housing block (12). Each connection port (28) is associated with a connection opening (30) on the reservoir side (20) of the housing block (12) (FIG. 2).

Figure 3:
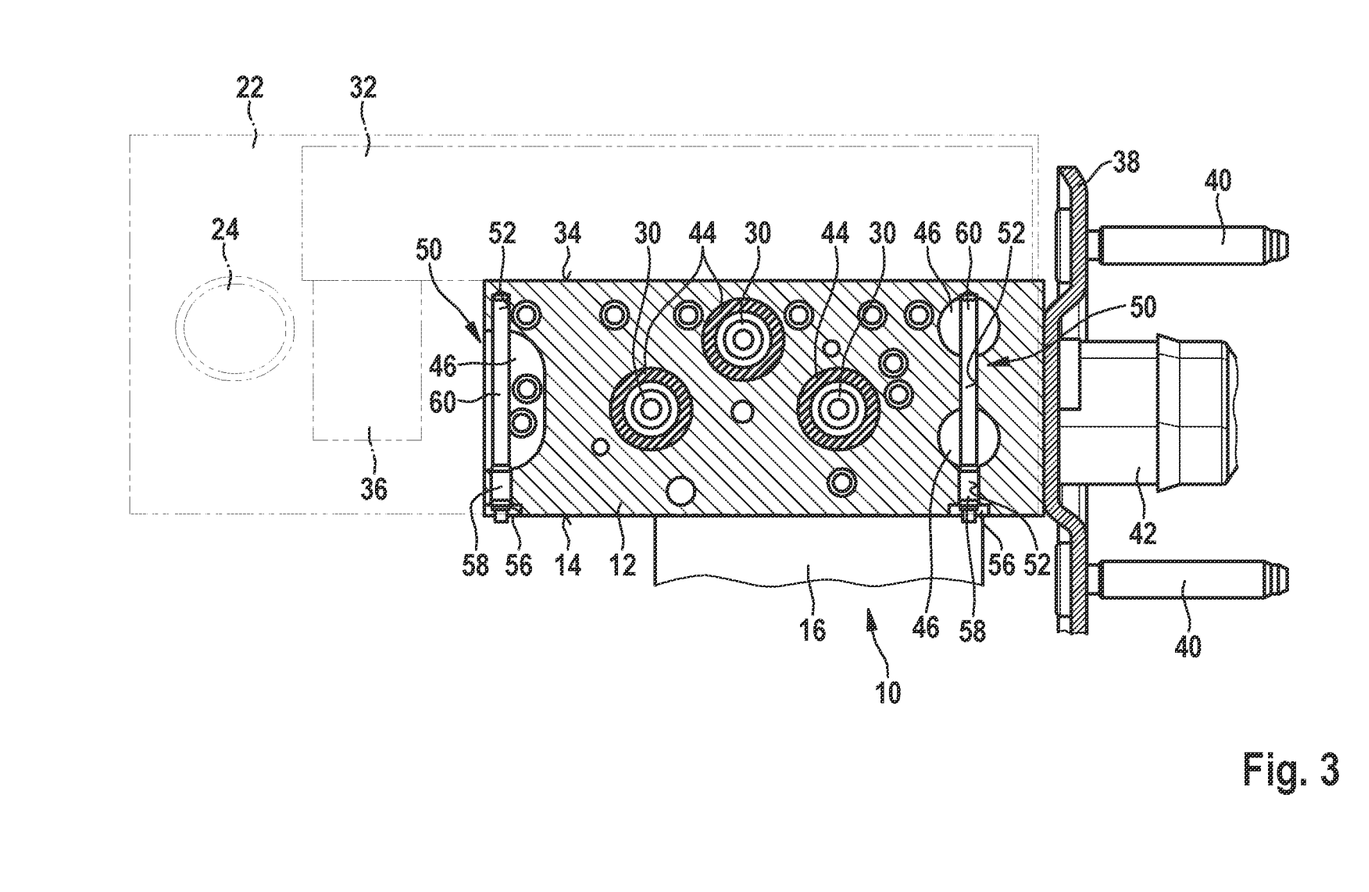
FIG. 3 is a plan view onto the hydraulic unit according to FIG. 2, wherein the reservoir, the control device and the housing block are transparently depicted.

In addition to the motor (16) and the reservoir (22), an electronic control device (32) is mounted to the housing block (12). As FIG. 3 shows, this control device (32) is fastened on a control device side (34) of the housing block (12) which lies opposite the motor side (14) in plane-parallel manner. The reservoir side (20) of the housing block (12) adjoins the motor side (14) and the control device side (34) of the housing block (12).

Of the electronic control device (32), FIG. 1 shows just a rectangular plug housing (36) connected in one piece therewith on the peripheral side of the housing block (12) on the left according to FIG. 1. The electronic control device (32) is connectable with the remaining vehicle electronics, in particular with the vehicle power supply, via an associated device plug. Since the plug housing (36) is located to the side of the housing block (12), the plug-in connection between device plug and electronic control device (32) can be produced or released unhindered by the assemblies such as motor (16) or reservoir (22) mounted to the housing block (12).

Opposite the plug housing (36), a mounting flange (38) with horizontally projecting stay bolts (40) is visible on a further peripheral side of the housing block (12). By way of this mounting flange (38) or the stay bolts (40) thereof, the hydraulic unit (10) can be fastened to a bulkhead of a vehicle. Between the stay bolts (40), a guide sleeve (42) likewise projecting horizontally from the housing block is also visible. It serves to guide a piston of a brake master cylinder, with which a braking intention can be communicated by a driver to the vehicle brake system. The brake master cylinder is incorporated into the housing block (12) of the vehicle brake system in addition to the components for generating a braking pressure and for closed-loop or open-loop control thereof.

In the depiction according to FIG. 2, the reservoir (22) has been removed from the housing block (12) of the hydraulic unit (10) to reveal details relating to fastening the reservoir (22) to the housing block (12). The control device (32) normally mounted on the control device side (34) has also been removed for this purpose.

According to FIG. 2, pressure medium-carrying channels closed to the surrounding environment also open on the reservoir side (20) of the housing block (12). Roughly at the level of the motor (16), a total of three connection openings (30) arranged offset relative to one another are apparent which are intended for pressure medium supply of the hydraulic unit (10) via the reservoir (22). Annular sealing elements (44) protruding upward relative to the reservoir side (20) of the housing block (12) are provided in order to receive therein and circumferentially seal the above-mentioned connection ports (28) of the reservoir (22). By way of the plurality of connection openings (30) present, the reservoir is centered when mounted to the housing block (12).

In addition to the connection openings (30), a plurality of recesses (46) open toward the reservoir side (20) are provided on the housing block (12) and serve to fasten the reservoir (22). To this end, fastening pegs (48) are formed on the reservoir which project into one of these recesses (46) when the reservoir (22) is in the attached state. Using retaining pins (50), which are received in transverse bores (52) of the housing block (12) and pass through these recesses (46), the reservoir (22) is fastened indirectly to the housing block (12). To this end, the fastening pegs (48) of the reservoir (22) each have at their free end a through-hole (54) which is aligned with the associated transverse bore (52) and which, in its installed state, is accordingly passed through by a retaining pin (50) inserted in this transverse bore (52).

Two of these housing block-side recesses (46) are located at an end of the reservoir side (20) facing the mounting flange (38), while a third recess (46) is provided at the opposite end of this reservoir side (20). The two mounting flange-side recesses (46) are circular and lie next to one another or one behind the other on a notional straight line running perpendicularly from the motor side (14) to the control device side (34) of the housing block (12). The single recess (46) opposite thereto has an oval or elongate hole-shaped morphology and is open both to the reservoir side (20) and to a narrow or peripheral side of the housing block (12) perpendicularly adjoining this reservoir side (20). It is provided to jointly receive two fastening pegs (48).

Furthermore, the already mentioned transverse bores (52) for receiving retaining pins (50) for the reservoir (22) are present on the housing block (12). All the transverse bores (52) start from the motor side (14) of the housing block (12), extend substantially perpendicular to the motor side (14) toward the control device side (34) of the housing block (12), in so doing pass through the recesses (46) for receiving the fastening pegs (48) of the reservoir (22) and finally end in the interior of the housing block (12) in the manner of a blind hole. On the motor side (14) the transverse bores (52) each open into flat portions (56), which are preferably open on the peripheral side toward at least one of the peripheral sides of the housing block (12). The retaining pins (50) for the reservoir (22) each lie with a pin head (58) in the flat portion (56) on the motor side (14), without this pin head (58) protruding axially appreciably beyond the motor side (14) of the housing block (12). The retaining pin (50) or pin head (58) can thus no longer hinder the bringing about of contact between pressure medium-carrying lines and the connections on the motor side (14) of the housing block (12) and in parallel thereto provides sufficient space on the housing block (12) for assembly tools for producing or releasing said pressure medium contact and/or for fastening or removing the reservoir (22), for example in the case of repair.

In the first exemplary embodiment according to FIG. 2, a total of two retaining pins (50) are provided for fastening the reservoir (22), which pins are arranged spaced to the left and right from the total of three connection openings (30) for supplying the housing block (12) with pressure medium and thus enclose these connection openings (30) between them.

The placing or spacing of the connection openings (30) relative to the retaining pins (50) is in this case achieved such that torques brought about by the retaining or installation forces arising at the reservoir (22) cancel one another out, i.e. a moment equilibrium prevails at the reservoir. The prevailing moment equilibrium prevents, on the one hand, tipping or vibration of the reservoir (22) relative to the housing block (12) and, on the other hand, interior stresses on the installed reservoir (22) which might initiate cracking.

FIG. 3 shows the first exemplary embodiment again from above, in this case enabling a view through the reservoir (22), the control device (32) and the housing block (12). It is clear from this view that the transverse bores (52) for the retaining pins (50) are of blind hole-like configuration, i.e. they end in the interior of the housing block (12).

Furthermore, FIG. 3 shows details of the retaining pins (50). These retaining pins (50) are divided into a pin head (58) and a shank portion (60). The pin head (58) is only slightly greater in its external diameter than the shank portion. It is produced during production of an external thread by roll-threading onto the shank portion (60) as a result of the material displacement arising in the process. The periphery of a pin head (58) is available for the addition of working surfaces for a screw assembly tool, with which the retaining pin (50) is screwed into the transverse bore (52). The thread on the shank portion (60) of the retaining pin (50) is embodied as a self-tapping, preferably trilobular, external thread.

The retaining pin (50) is screwed into the transverse bore (52) until its end opposite the pin head (58) rests or is axially supported in the interior of the housing block (12). This end of the retaining pin (50) may to this end be rounded or conical with a flat portion at the end face. Axial support may be achieved both against the closed end of a transverse bore (52) and against a peripheral wall of a recess (46) for receiving a fastening peg (48) of the reservoir (22), into which recess this transverse bore (52) opens. A contact surface for the pin head (58) against the housing block (12) is not provided.

According to FIG. 3, the reservoir (22) covers the reservoir side (20) of the housing block (12) and a peripheral side adjacent thereto of the electronic control device (32). The filling port (24) of the reservoir (22) is arranged in a region of the reservoir (22) protruding relative to the housing block (12) and the plug housing (36). With the proposed fastening, a reservoir (22) of a specified volume may be used which is shallower in height due to its enlarged base surface (26).

Due to the transparent depiction of the reservoir (22), the electronic control device (32) and the housing block (12) in FIG. 3, the components anchored in the housing block (12) for generating braking pressure and for open- or closed-loop control thereof, inter alia, are schematically apparent in the background. However, only the parts of these components projecting from the housing block (12) into the electronic control device (32) are visible. Furthermore, the view into the interior of the housing block (12) allows a view onto the channels formed in the housing block (12) for bringing these components into pressure medium-conveying contact. Not all of the channels, receptacles or components provided are apparent, however.

As indicated above, FIG. 4 shows the reservoir (22) from the base side (26) thereof facing the housing block (12). Visible as a result are the connection ports (28) formed in one piece onto the reservoir (22) or the base side (26) thereof and via which the reservoir (22) may be brought into pressure medium-tight contact with the housing block (12) with the assistance of annular sealing elements (44) placeable thereon. Also apparent are the fastening pegs (48) likewise formed in one piece with the reservoir (22), which project into the respectively associated recesses (46) open toward the reservoir side (20) on installing the reservoir (22) onto the housing block (12) of a hydraulic unit (10). By way of example, in each case one pair of fastening pegs (48) are associated with a retaining pin (50) or a transverse bore (52) of the housing block (12). The two fastening pegs (48) arranged on the left in FIG. 4 are provided by way of example in order to project jointly into the one recess (46) open toward the peripheral side and the reservoir side (20) of the housing block (12). It is accordingly thus not necessary to allocate each of the fastening pegs (48) its own recess (46).

Finally, FIG. 4 also shows the through-holes (54), aligned with the transverse bores (52) in the housing block (12), at the free ends of the fastening pegs (48), through which transverse bores the shank portion (60) of the retaining pin (50) passes when the reservoir (22) is mounted.

Figure 5:
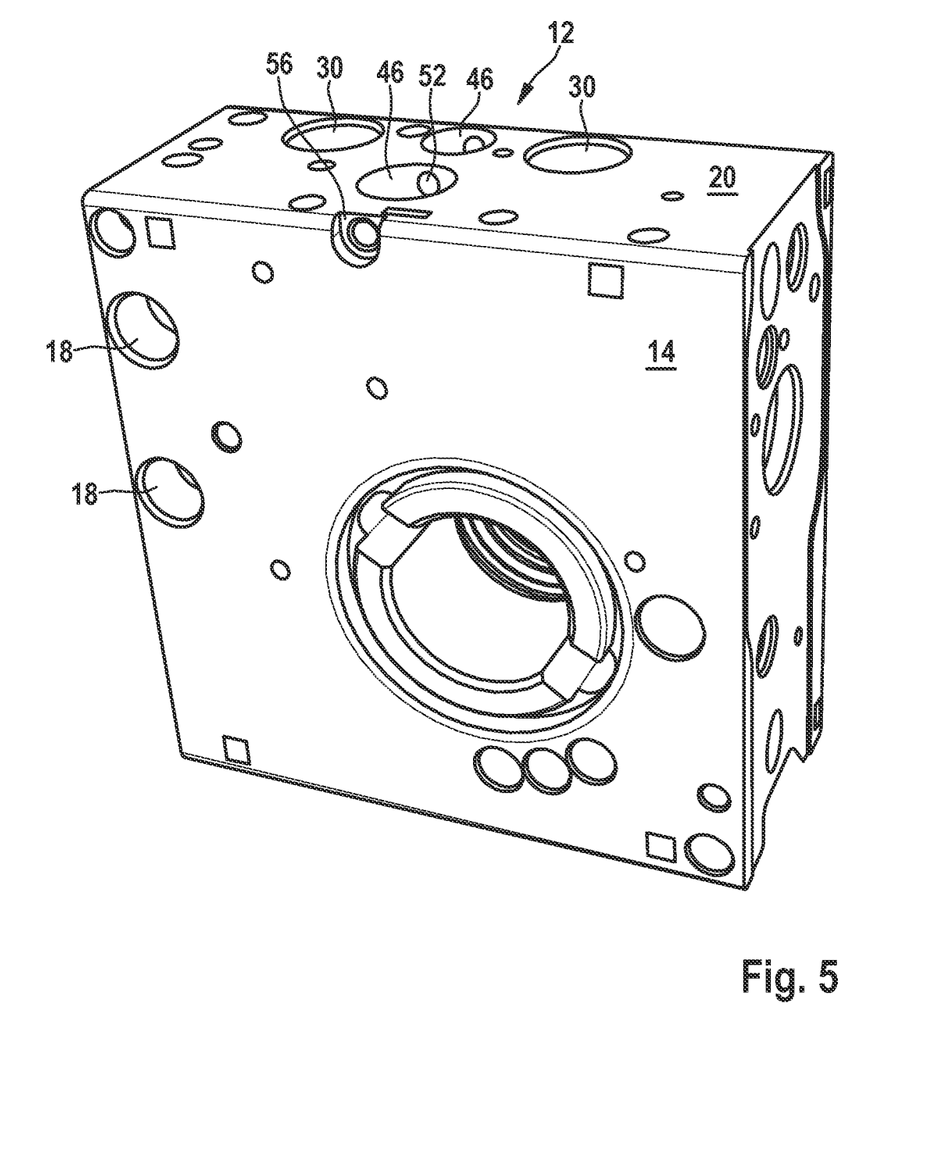
FIG. 5 depicts a second exemplary embodiment of the present invention using a view from top right onto the motor side of a housing block of the hydraulic unit.

A second exemplary embodiment of the present invention according to FIG. 5 has a housing block (12), on the reservoir side (20) of which just two connection openings (30) are provided for supplying the vehicle brake system with pressure medium. These two connecting openings (30) are spaced from one another in the direction of the longitudinal extent of the reservoir side (20) to such an extent that space is present therebetween for arranging two recesses (46) for receiving the reservoir-side fastening pegs (48). These recesses (46) lie next to one another or one behind the other in a direction perpendicular to the longitudinal extent of the reservoir surface (20). A transverse bore (52) provided in the housing block (12), coming from the motor side (14), passes through the first recess (46) and ends with its opening in the second recess (46) facing the control device side (34). On the motor side (14) of the housing block (12), the transverse bore (52) opens, according to the present invention, into a flat portion (56), which is provided to receive the pin head (58) of a retaining pin (50) to be inserted into the transverse bore (52).

The respective spacings of the connection openings (30) relative to the transverse bore (52) or relative to the retaining pin (50) arrangeable in this transverse bore (52), when considered in the direction of the longitudinal extent of the housing block (12), are roughly equal in size. In this way, with this second exemplary embodiment of the present invention too the moment effects at the reservoir (22) which are generated at the reservoir (22) by the force of the retaining pin (50) and by the forces of the connection ports (28) cancel each other out as soon as the reservoir is fastened as intended to the housing block (12). Interior stresses at reservoir (22) and possible tipping movements of the reservoir (22) relative to the housing block (12) may in this way be prevented, even in the case of a hydraulic unit with just two connection ports (28) and just one retaining pin (50) for fastening the reservoir (22).

It goes without saying that further modifications or additions to the two exemplary embodiments going beyond what has been explained are possible without these modifications or additions going beyond the scope of the present invention.

What is claimed is:

1. A hydraulic unit for an electronically slip-controllable vehicle brake system, the hydraulic unit comprising:
a cuboidal housing block having a first side, which is a motor side for mounting of a motor thereon, and a second side opposite the first side, the housing block being equipped with electrically actuatable components configured to generate braking pressure and for open- or closed-loop control thereof;
a reservoir for pressure medium mounted on a reservoir side of the housing block, the reservoir side adjoining the first side and extending substantially perpendicular to the first side; and
a retaining pin that is received in a transverse bore in the housing block and that includes a pin head as a terminal end thereof;
wherein:
the reservoir includes at least one fastening peg projecting (I) from a side of the reservoir that faces the housing block (II) towards the housing block and (III) into a first recess in the housing block;
the first recess is open towards the reservoir side;
the transverse bore passes through the first recess;
a flat portion that is part of the housing block is parallel to the first side, is located between the first side and the second side, and is formed by a second recess cut into the first side in a direction towards the second side;
a respective through-hole in each of the at least one fastening peg is aligned with the transverse bore and is passed through by the retaining pin;
each of the at least one fastening peg is arranged between (I) a plane of the flat portion and (II) a plane of the second side of the housing block; and
the transverse bore opens on the first side into the flat portion such that the pin head of the retaining pin lies against the flat portion on a side of the flat portion facing away from the second side of the housing block and without the pin head protruding axially beyond the first side of the housing block in a direction away from the second side.

2. The hydraulic unit as recited in claim 1, wherein the transverse bore ends in an interior of the housing block in the manner of a blind hole.

3. The hydraulic unit as recited in claim 1, wherein the retaining pin has a shank portion with a self-tapping thread and wherein working surfaces are formed at an outer circumference of the pin head for applying torque via a screw assembly tool.

4. The hydraulic unit as recited in claim 1, wherein the retaining pin is screwed into the transverse bore until it rests and is axially supported with an opposite end from the pin head in the interior of the housing block.

5. The hydraulic unit as recited in claim 1, wherein the flat portion, for receiving the pin head of the retaining pin, is open at a periphery to the reservoir side of the housing block.

6. The hydraulic unit as recited in claim 1, wherein the reservoir mounted to the housing block at least partly covers the reservoir side of the housing block and a peripheral side, facing the reservoir, of a control device.

7. The hydraulic unit as recited in claim 1, wherein the first recess for the fastening peg of the reservoir in the housing block is open laterally toward a peripheral side of the housing block adjoining the reservoir side.

8. The hydraulic unit as recited in claim 1, wherein the reservoir has two connection ports for bringing the reservoir into pressure medium-conveying contact with the housing block, the connection ports projecting toward the housing block and the fastening peg of the reservoir being placed in such a way between the connection ports that spacings of the connection ports from the fastening peg in a direction at least of a longitudinal extent axis of the reservoir side of the housing block, are equal in size.

9. The hydraulic unit as recited in claim 1, wherein the reservoir has at least three connection ports for bringing the reservoir into pressure medium-conveying contact with the housing block, the connection ports projecting from the reservoir toward the housing block and the at least one fastening peg includes two fastening pegs between which the connection ports are arranged.

10. The hydraulic unit as recited in claim 9, wherein the connection ports are arranged relative to the fastening pegs in such a way on the reservoir that, when the reservoir is mounted to the housing block, moment equilibrium prevails at the reservoir between torques which are initiated by forces which are transferred from the connection ports and from the fastening pegs to the reservoir.

11. The hydraulic unit as recited in claim 1, wherein at least one pressure medium connection is provided on the motor side of the housing block to bring the housing block into pressure medium-conveying contact with wheel brakes of the brake system.

* * * * *